United States Patent [19]

Allen

[11] Patent Number: 4,740,101

[45] Date of Patent: Apr. 26, 1988

[54] END FITTING AND COUPLING SYSTEM FOR SUCKER RODS

[76] Inventor: Loy F. Allen, 4317 Springbrook, Odessa, Tex. 79762

[21] Appl. No.: 849,497

[22] Filed: Apr. 8, 1986

[51] Int. Cl.⁴ .............................. B25G 3/20; F16B 2/14
[52] U.S. Cl. ..................................... 403/374; 403/275; 403/334
[58] Field of Search ............... 403/265, 266, 267, 268, 403/269, 275, 374, 334; 24/122.6, 136 L

[56] References Cited

U.S. PATENT DOCUMENTS

| | | | |
|---|---|---|---|
| 1,392,480 | 10/1921 | Clarke | 403/275 |
| 2,659,062 | 11/1953 | Tibbetts | 403/275 X |
| 3,698,749 | 10/1972 | Yonkers | 403/334 X |
| 4,205,926 | 6/1980 | Carlson | 403/343 |
| 4,430,018 | 2/1984 | Fischer | 403/374 X |

FOREIGN PATENT DOCUMENTS

| | | | |
|---|---|---|---|
| 1364098 | 5/1964 | France | 403/268 |
| 2410186 | 7/1979 | France | 24/122.6 |

*Primary Examiner*—Andrew V. Kundrat
*Attorney, Agent, or Firm*—Wendell Coffee

[57] ABSTRACT

A composite sucker rod to be formed into a rod string for an oil well is made by placing a coupler unit having a box end on each end of the rod. The coupler unit has a bore extending the full length of the coupler unit. For fabrication, the coupling unit is telescoped over the rod and a conic expansion portion formed on the end of the rod so that the conic expansion portion may be jammed into a tapered bore on the rod. The conic expansion portion is formed when the end is clear of the coupling unit so that it may be well bonded to the rod by precise application of adhesive, heat, and pressure. By using box end couplings on the rod and pin end couplings on coupling units between the rod it is possible to have a smaller overall outside diameter for any given strength of coupling unit.

9 Claims, 2 Drawing Sheets

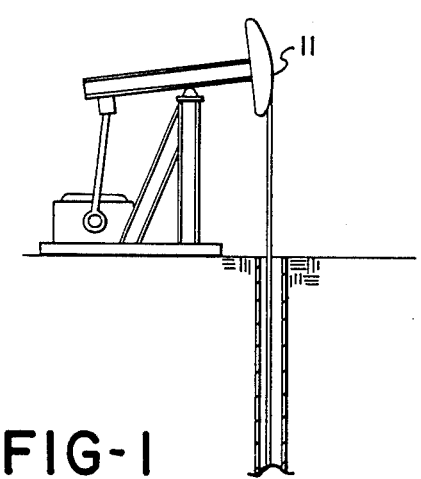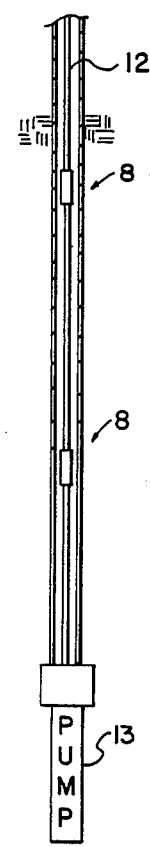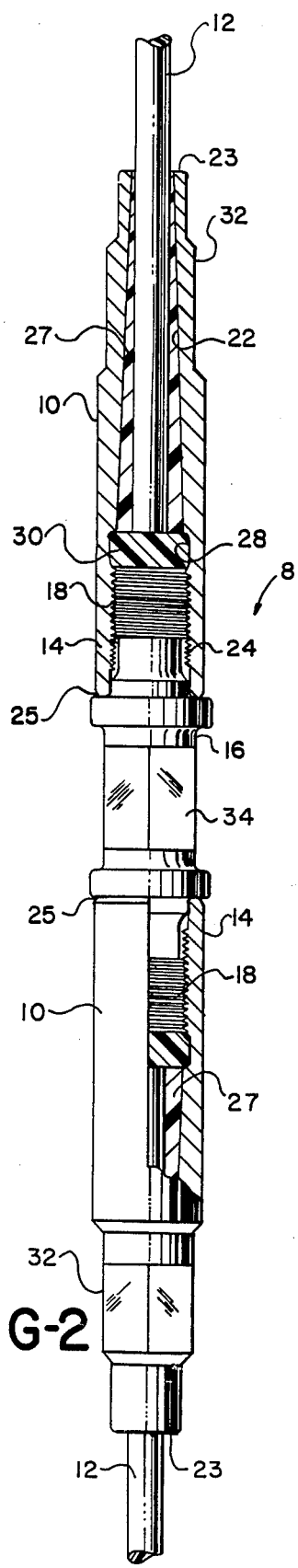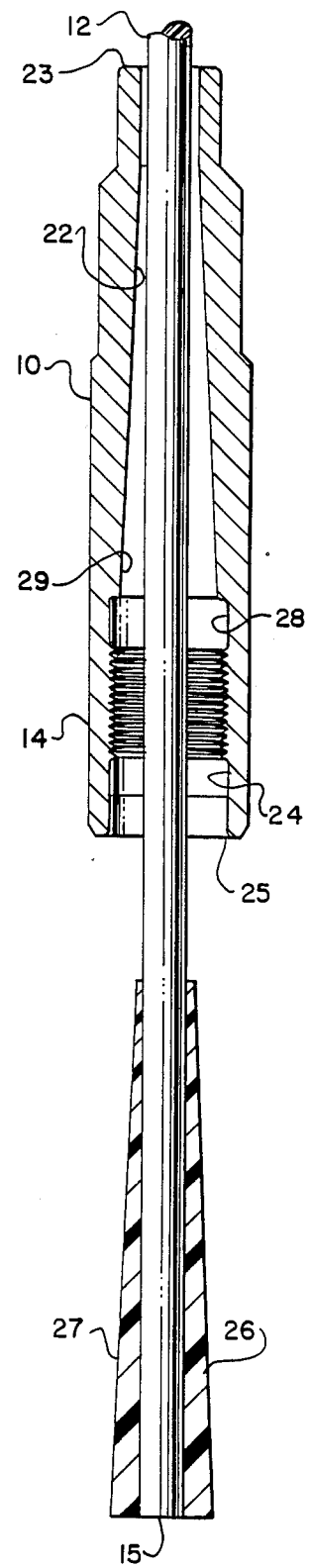
FIG-1
FIG-2
FIG-3

END FITTING AND COUPLING SYSTEM FOR SUCKER RODS

RIGHTS TO INVENTIONS UNDER FEDERAL RESEARCH

There was no federally sponsored research and development concerning this invention.

BACKGROUND OF THE INVENTION (1) Field of the Invention

This invention relates to composite sucker rods for wells and more particularly to couplings for the sucker rod.

(2) Description of Related Art

Oil field wells are often over 20,000 feed deep. Sucker rods, which are usually manufactured in lengths of about 25', 30' or 37' are joined together by means of couplings to form a rod string which extends the length of the well casing. In a typical well, this rod string connects the "horse-head" to the piston in the pump at the base of the well. With each stroke of the piston, oil is forced up to the surface through the annulus between the rod and the tubing.

In recent years, composite rods have been used to form the individual sucker rods of the string. The composite rods exhibit many characteristics which make them superior to steel rods. In using composite rods the couplings to couple one length of sucker rod to the next have caused problems.

In this specification, the term "composite rod" should not be equal to glass fiber rods. In the technology today the composite rods consist typically of a high strength fiber other than glass which are bonded together into a single rod. Those having ordinary skill in the art will recognize that these fibers may be of carbon or aromatic polyarmide (commonly known by Du Pont's Trademark KEVLAR) or other substance. The term composite rods is used herein to indicate a manufactured material having high tensile strength.

Normally the couplings by nature will be larger in diameter than the rods which they connect together. However, it is desirable that they not be excessively large otherwise they will form an obstruction to the flow of fluid (oil) in the annulus between the rod and its coupling and the tubing. The limit to which the diameter of the coupling can be reduced is limited inasmuch as normally the strength of the coupling in tension is equal to or greater than the strength of the rod.

Also the joining of the composite material to the steel of the coupling has been a problem.

Traditionally and according to API specifications the sucker rods in oil wells will have a pin on each end of the rod. The rods will be connected together by a coupling unit which is typically less than 12 inches in length and has a box or female connection on each end thereof.

Prior connections included placing the rod directly within the socket, and holding it in place with epoxy. The stretching of the rod led to the breaking up and failure of the epoxy. Subsequently, there would be nothing to hold the rod in place. Its movements would then be erratic. Gluing the rod into the socket directly also made repairs more difficult on either of them.

Prior attempts to hold a composite rod within a tapered sleeve by the use of wedges has met with failure when the wedges were not adhered to the rod. I.e., to attempt to connect the rod within a socket as is shown with steel cable in CARLSON, (discussed below) have not been suitable for a composite rod.

Likewise, attempts to insert a composite rod into a socket with a tapered form in a socket and to pour epoxy or other resins or liquid composite material into the blind hole around the rod have not been satisfactory. The main problem has been the inability to form a good bond between the material forming the expansion cone and the rod itself.

FIG. 5 illustrates a unit commercially on the market which is most similar to this invention. Socket 38 has pin 40 upon one end. Tapered blind hole 42 is on the end opposite the pin. Composite rod 44 will be inserted within the blind hole and liquid resin poured in the blind hole 42 to form an expansion portion 46 around the rod 44 within the blind hole. The socket unit 38 as prepared in this way would be connected into a string by conventional box end couplers 48.

Before this application was filed, a search was made in the United States Patent and Trademark Office. That search developed the following United States Patents:
BUTLER et al. U.S. Pat. No. 991,196
SHAFFER et al. U.S. Pat. No. 1,384,489
HOWARD et al. U.S. Pat. No. 3,168,340
CARLSON et al. U.S. Pat. No. 4,205,926
SABLE et al. U.S. Pat. No. 4,249,831
PRIDY et al. U.S. Pat. No. 4,329,124
PETTERSON et al. U.S. Pat. No. 4,497,866

CARSLON discloses coupling sections of steel cable into a sucker rod string. Generally all of CARLSON'S disclosure follows the conventional teaching that a pin is placed on each end of each rod unit. However, in FIG. 18, CARLSON discloses a box coupling. CARLSON does not disclose how the box couplings would be connected together. One assumes that the rod would have a box on one end an pin on the other.

The metal on the pin end has minimum cross sectional area in the embodiments having pin connectors. I.e., the metal is removed to provide for the bore through the coupling leaving very little metal in the cross sectional area at the pin.

Also CARLSON chooses to use a shoulder between the tapered bore of his coupling and a cylindrical portion on his "inboard" or medial end. I.e., CARLSON'S tapered bore at the small end terminates with an inward facing shoulder. Therefore if through cylindrical stretch of the coupling (or for any other reason) the wedges of CARLSON butt against the shoulder it will cause a loosening of the grip of the wedges upon the cable. The only box connection CARLSON shows is in FIG. 18. At column 12, he states: "Generally speaking, the use of an internal wedging element in the strand permits lesser internal diameter passageway through the collar for a given size stand or cable than the use of external wedging elements as seen in FIGS. 18-20. The strand engaging means of FIGS. 1-3, inclusive gives greater gripping power than the devices of FIGS. 18-20, inclusive with no chance of strand turning on the collar." (Column 12, line 41-49)

The remaining patents are considered pertinent because the applicant believes the Examiner would consider anything revealed by the search to be relevant and pertinent to the examination of this application.

SUMMARY OF THE INVENTION (1) New Functions and Structure

I have invented a sucker rod coupling elements having which fit within each other telescopically. The tension member is a solid composite fiber rod. The rod is glued, by means of adhesives, heat and pressure, within a conic expansion tube composed of reinforced plastic or composite material. The inner diameter of the conic tube is constant, and is machined to allow the rod to fit snugly within it. The outer diameter of the conic tube is tapered, creating a smooth conical expansion from its smallest diameter to its largest diameter.

The outside of the conic tube is machined to fit within the tapered end of a socket unit. The socket unit has a box end with threads, by which it is attached to a coupling unit with pins on each end. The coupler units connect the socket units to each other. Current technology suggests that socket and coupling units of steel are preferred, although composite material may be used.

The rod, conic tube and socket fit together snugly in a telescopic fashion, but the conic tube may be slipped from the socket for repairs.

A wrench flat is located on the outside of the socket unit along the tapered bore at the small end thereof, where there is less chance of breakage either from torque while making or breaking the joints or from tension while pumping.

Traditionally, the rods had pin couplers on each end and were connected by steel coupling units, the coupling units having threaded boxes on each end. In my invention, the threaded bores are located on each socket unit, and the coupler unit possesses a pin on each end. This arrangement provides greater support to the entire combination of sucker rod units.

With a bore extending the entire length of the socket or coupling unit, the end of the rod may be extended beyond the end of the coupling unit. Thus, the coupling unit can be telescoped onto the rod so that the end is exposed. With the end exposed the conic tube or any other conical expansion on the end of a composite rod may be attached in a controlled environment, i.e., having the end of the rod exposed and free of the coupling, the conical expansion on the end of a rod can be made with closely controlled temperature and pressure.

By having a box end on the socket unit, the strength of the coupler can be increased greatly for the same external diameter. This is because there is a necessity of having a cross sectional area of material around the bore through the socket coupler unit. If the material around the bore of the socket coupler area has external threads on it, it may be seen that it is necessary then to put a cuff or a collar around the external threads to join the units together. Whereas if the threads are internal, then the material from the threads outward is all of the increase of diameter necessary from the internal bore.

(2) Objects of this Invention

An object of this invention is to provide a sucker rod for wells.

Further objects are to achieve the above with a device that is sturdy, compact, durable, lightweight, small diameter, simple, safe, efficient, versatile, ecologically compatible, energy conserving, and reliable, yet inexpensive and easy to manufacture, install, and maintain.

Other objects are to achieve the above with a method that is versatile, ecologically compatible, energy conserving, rapid, efficient, and inexpensive, and does not require highly skilled people to install, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is a schematic representation of an oil well with a rod string extending from the surface to a pump at the bottom of the well.

FIG. 2 is a partial sectional view of two composite rods coupled together using socket units and coupling units according to this invention.

FIG. 3 is a sectional view showing the end of the rod extending from a socket unit for the application of the conic expansion portion thereon.

Figure 4:
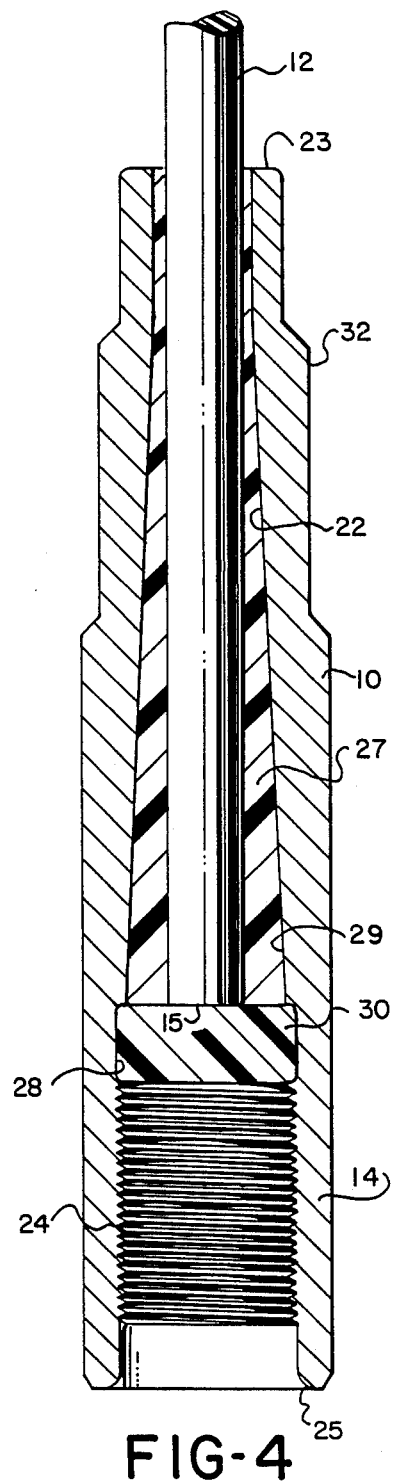
FIG. 4 is a sectional view of the socket unit upon the end of the composite rod.
Figure 5:
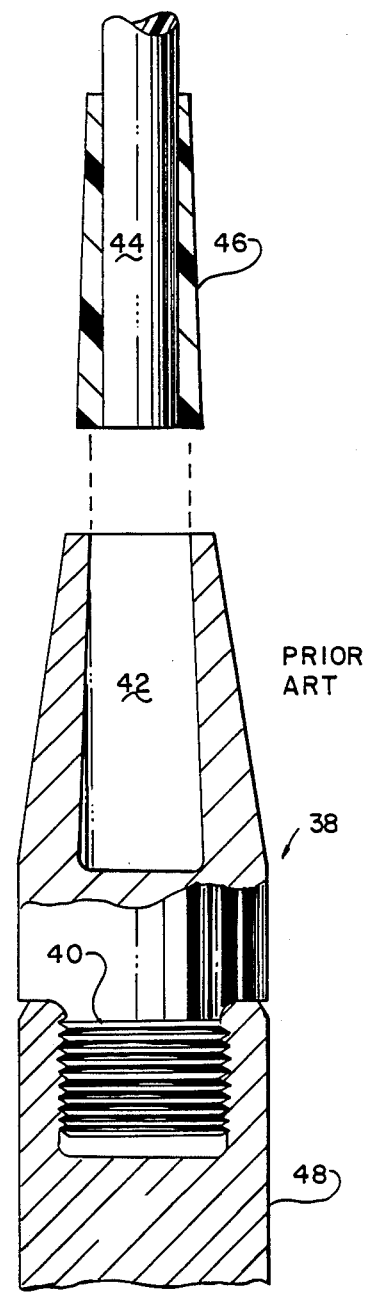
FIG. 5 is a schematic representation of a coupling unit as used prior to this invention.

As an aid to correlating the terms describing this invention to the exemplary drawing the following catalog of elements is provided:

Catalog of Elements 8 coupling assembly
10 socket unit
11 horse head
12 composite sucker rod
13 pump
14 threaded box
15 end
16 coupler unit
18 threaded pins
22 tapered bore
23 tapered end
24 cylindrical bore
25 box end
26 conic tube
27 conic expansion portion
28 diametrical groove
29 larger diameter
30 plug
32 wrench flats
38 socket unit
40 pin
42 blind hole
44 rod
46 expansion portion
48 coupler

DESCRIPTION OF THE PREFERRED EMBODIMENT

A general installation of my invention includes two socket units 10 and a coupler unit 16 to form a coupling assembly 8. Each socket unit is coupled at one end to a joint of composite rod 12 and has threaded box 14 on the other end. The socket units 10 and thus the rods 12 are connected by means of coupler unit 16. The coupler unit has threaded pins 18 on each end, and each pin 18 is threaded into one of the threaded boxes 14. Since a typical coupler unit is less than 12 in. in length and a typical rod is at least 25 ft. in length, the coupler is much shorter than the rod.

A series of connected rods 12, and coupling assemblies 8 form a rod string extending vertically downward from horse head 11 of a pump jack at the surface of the earth to pump 13 at the bottom of the well far below the surface.

The socket unit 10 includes an axis which extends vertically, with axial tapered bore 22 at medial or tapered end 23 and axial cylindrical bore 24 at distal or box end 25.

To place the socket unit 10 upon end 15 of composite sucker rod 12, the end 15 is inserted through the tapered end 23, through the tapered bore and extended on through the cylindrical bore 24 at the box end 25 (FIG. 3). The end 15 is extended from the socket unit until it is clear of the socket unit and not obstructed by the socket unit when work is being done upon the end 15. Stated another way, the socket unit 10 is telescoped over the composite rod 12 so that the end 15 is clear of the socket unit.

Conic expansion tube 26 is telescoped over the composite rod 12, having been prepared to fit snugly. The tube 26 may be formed of reinforced plastic or composite material The tube is adhered onto the composite rod 12 by the application of adhesives, heat, and pressure to form conic expansion portion 27. Those having skill in the composite materials art will understand the advantages to having the end clear of the socket so that they can control the heat and pressure applied to the conic tube 26 as it is adhered or bonded to the socket rod 12. Also those with skill will know the proper adhesive to use and the amount of heat and pressure that is desirable to perform this particular bonding. The socket unit 10 is then moved axially to be telescoped over the tube 26 and rod 12 combination and moved to jam the conic expansion portion 27 on the rod into the tapered bore 22 in the socket.

Those with skill in the art will understand that the conic expansion portion 27 could be formed upon the end of the composite rod 12 by several means or processes other than having a preformed tube. It will occur to those having skill in the art that the tube could be split lengthwise in the form of two wedges and these two wedges adhered or bonded to the end of the rod. Also it will occur to those having skill in the art that composite material in liquid or plastic form could be molded onto the end of the rod. Other means will occur to those having ordinary skill and working with composite materials to form a conic expansion portion on the end of the rod. It will be understood that the end of the rod extends beyond the socket unit 10 so that it is available to have a closely controlled application of heat, pressure, and adhesives to form the conic expansion portion there.

The conic expansion portion 27 must be well bonded or adhered to the rod 12 for satisfactory results.

Circumferential internal groove 28 is in the socket unit between the cylindrical bore 24 and the tapered bore 22. After the conic expansion portion 27 has been placed in the tapered bore 22, plug 30 is placed in the groove 28 against the end of conic expansion portion 27 which is the end 15 of the rod 12 for support.

That is to say, that the plug 30 prevents the conic expansion portion 27 from moving out of the taper 22. Should there be compression upon the string, the plug 30 would prevent any loosening of the conic expansion portion 27 from within the tapered bore 22. It will be understood that it is necessary to avoid any movement of the parts to avoid any weakening or deterioration thereof.

The plug 30 may be made of a deformable elastomer so that it will fill the groove 28 after the conic espansion portion has been wedged tightly within the tapered bore. An alternate method of insertion the plug 30 within the internal groove 28 would be to place the rod with the distal or box end 25 upward and pour a liquid resin in it which, when set, would be securely and firmly both within the internal groove 28 and securely and firmly against the end 15 of the rod 12.

Wrench flat 32 is located along the exterior portion of the socket unit 10 within which the tapered bore 22 is located. The wrench flat is used for a wrench to grip the socket unit.

The wrench flat 32 is located on the exterior of the socket unit 10 at the small end of the taper. I.e., the wrench flats are located along the taper bore adjacent to the medial or taper end 23 of the socket unit 10. Analysis will show that the tensile load within the socket unit 10 is less at the tapered end 23 than it is at the point of the internal groove 28. Since the wrench flats reduce the cross sectional area of the material, it is desirable that they be placed where this reduction of the cross sectional area can be tolerated most easily which is at the point where the tensile load in the coupler is of a smaller amount. The coupler unit 16 also has wrench flats 34.

Also it will be noted that the tapered bore 22 has its smallest diameter at the medial or tapered end 23 and that the taper extends smoothly from the larger diameter 29 to the smallest diameter of the bore through the socket unit 10. Those skilled in the art will understand that it is desirable that there be no abrupt changes in the cross sectional area inasmuch as abrupt changes result in stress points. Furthermore, it is desirable that the wedging or tapered contour be uninterrupted. I.e., the internal shoulders within the tapered unit at the small of the tapered unit are to be avoided lest the conic expansion portion 27 on the rod 12 pull against the internal shoulder. Such a result would be contrary to the operation of the socket unit that the load from the rod is transferred to the coupling along the taper. For the expansion portion 27 to push against a shoulder would result in a different type of transfer of load from the rod to the socket unit 10 than through the taper.

Examination of the drawings will show that the tapered bore has a larger diameter which connects with and is proximate to the cylindrical bore 24. Also it will be noted that the cylindrical bore has internal threads and it also has a diameter which is at least as large as the largest diameter 29 of the tapered bore 22. These relationships make it possible to move the largest end of conical expansion portion 27 through the cylindrical bore 24 when the socket unit 10 is being moved axially along the rod 12 to jam the socket unit over the conic expansion portion 27.

The embodiment shown and described above is only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A socket unit for a composite sucker rod for an oil well comprising in combination:
   a. an axis,
   b. a box end, and
   c. a tapered end,
   d. an axial cylindrical bore at the box end,
   e. internal threads in the cylindrical bore, f. an axial tapered bore at the tapered end, having:
  i. a large diameter connecting with and proximate the cylindrical bore,
  ii. a small diameter at the tapered end, and
  iii. said cylindrical bore having a diameter at least as large as the largest diameter of the tapered bore,
  iv. said taper extending smoothly from the large diameter to the smallest diameter, so that
g. the composite sucker rod fits snugly within the small diameter end,
h. a conical expansion on the end of the composite rod fits snugly in the taper, and
j. a circumferential internal groove in the socket between the cylindrical bore and tapered bore.

2. The invention as defined in claim 1 further comprising:
k. said composite sucker rod with a conic expansion portion in said tapered bore.

3. The invention as defined in claim 2 further comprising:
l. a plug in said groove against the end of the composite rod.

4. The invention as defined in claim 3 further comprising:
m. said socket unit being steel.

5. A joint of a composite sucker rod in an oil well sucker rod string including the structure as defined in claim 1 further comprising:
j. two of said socket units, each coupled at the tapered end to a joint of composite rod,
k. a coupler unit much shorter than the joint of rod having threaded pins on each end,
l. one of said threaded pins threaded into one of the threaded cylindrical bores, and
m. a circumferential internal groove in the socket between the cylindrical bore and tapered bore.

6. The invention as defined in claim 5 further comprising:
n. a plug in said groove.

7. The invention as defined in claim 6 further comprising:
o. said coupler units being steel.

8. The invention as defined in claim 7 further comprising:
p. wrench flats on the socket unit at the small end of the taper.

9. The invention as defined in claim 8 further comprising:
q. said conic expansion portion includes a tapered tube adhered to the rod.

* * * * *